United States Patent
Noh et al.

(10) Patent No.: US 12,494,270 B2
(45) Date of Patent: Dec. 9, 2025

(54) METHOD FOR DESIGNING TERNARY CATALYST USING MACHINE LEARNING

(71) Applicants: Hyundai Motor Company, Seoul (KR); Kia Corporation, Seoul (KR); Yonsei University, University—Industry Foundation (UIF), Seoul (KR)

(72) Inventors: Seunghyo Noh, Gyeonggi-do (KR); Hoje Chun, Seoul (KR); Byungchan Han, Seoul (KR)

(73) Assignees: Hyundai Motor Company, Seoul (KR); Kia Corporation, Seoul (KR); Yonsei University, University—Industry Foundation (UIF), Seoul (KR)

( * ) Notice: Subject to any disclaimer, the term of this patent is extended or adjusted under 35 U.S.C. 154(b) by 1065 days.

(21) Appl. No.: 17/523,372

(22) Filed: Nov. 10, 2021

(65) Prior Publication Data
US 2022/0310213 A1    Sep. 29, 2022

(30) Foreign Application Priority Data
Mar. 24, 2021    (KR) .................... 10-2021-0037961

(51) Int. Cl.
*G16C 20/70* (2019.01)
*B01J 35/34* (2024.01)
(Continued)

(52) U.S. Cl.
CPC .............. *G16C 20/70* (2019.02); *B01J 35/34* (2024.01); *B01J 35/45* (2024.01); *B01J 35/70* (2024.01);
(Continued)

(58) Field of Classification Search
CPC ..... B01J 23/8906; B01J 23/8926; C22C 5/04; C22C 9/00; G16C 20/70; G16C 60/00; G16C 20/10; B82Y 35/00
(Continued)

(56) References Cited

U.S. PATENT DOCUMENTS

2020/0066376 A1    2/2020  Maiti et al.
2020/0168300 A1*   5/2020  Goddard, III .......... B01J 35/391

FOREIGN PATENT DOCUMENTS

CN    105727993 A       7/2016
CN    105727993 B   * 11/2018   .......... B01J 23/8926
(Continued)

OTHER PUBLICATIONS

Hoje Chun et al., "First-principle-data-integrated machine-learning approach for high-throughput searching of ternary electrocatalyst toward oxygen reduction reaction." Chem Catalysis 1, pp. 855-869. (Year: 2021).*

(Continued)

*Primary Examiner* — Patricia L. Hailey
(74) *Attorney, Agent, or Firm* — Fox Rothschild LLP

(57) ABSTRACT

Disclosed is a method of manufacturing a ternary catalyst for an oxygen reduction reaction. The method may include constructing a database including catalytic activity of oxygen reduction reaction (ORR) of PtFeCu nanoparticles using machine-learning-based neural network potential (NNP), determining thermodynamically stable PtFeCu nanoparticles through Monte Carlo calculation, and selecting a type of the PtFeCu nanoparticles by analyzing a structure of PtFeCu nanoparticles.

11 Claims, 21 Drawing Sheets

(51) Int. Cl.
| | |
|---|---|
| *B01J 35/45* | (2024.01) |
| *B01J 35/70* | (2024.01) |
| *B01J 35/77* | (2024.01) |
| *B82Y 35/00* | (2011.01) |
| *G16C 20/10* | (2019.01) |
| *G16C 60/00* | (2019.01) |

(52) U.S. Cl.
CPC .............. *B01J 35/77* (2024.01); *G16C 60/00* (2019.02); *B01J 2235/00* (2024.01); *B01J 2235/10* (2024.01); *B01J 2235/15* (2024.01); *B01J 2235/30* (2024.01); *B82Y 35/00* (2013.01); *G16C 20/10* (2019.02)

(58) Field of Classification Search
USPC ........ 502/300, 326, 331; 420/466, 473, 496, 420/497; 73/863, 865.8, 866; 977/773, 977/810, 880
See application file for complete search history.

(56) References Cited

FOREIGN PATENT DOCUMENTS

| | | | | |
|---|---|---|---|---|
| CN | 114242185 A | * | 3/2022 | ............. G16C 10/00 |
| CN | 115132287 A | * | 9/2022 | ............. G06N 20/00 |
| KR | 10-2019-0130446 A | | 11/2019 | |
| KR | 10-2020-0052393 A | | 5/2020 | |

OTHER PUBLICATIONS

Tongjai Chookajorn et al., "Thermodynamics of stable nanocrystalline alloys: A Monto Carlo Analysis." Physical Review B 89, 064102; pp. 1-10. (Year: 2014).*
G. Kresse and J. Furthmuller, Physical Review B, 1996, 54, 11169, "Efficient iterative schemes for ab initio total-energy calculations using a plane-wave basis set".
J. Hafner, Journal of Computational Chemistry, 2008, 29, 2044-2078, "Ab-Initio Simulations of Materials Using VASP: Density-Functional Theory and Beyond".
P. E. Blochl, Physical Review B, 1994, 50, 17953, "Projector augmented-wave method".
J. P. Perdew, K. Burke and M. Ernzerhof, Physical Review Letters, 1996, 77, 3865, "Generalized Gradient Approximation Made Simple".
B. Hammer, L. B. Hansen and J. K. Nørskov, Physical Review B, 1999, 59, 7413, "Improved adsorption energetics within density-functional theory using revised Perdew-Burke-Ernzerhof functionals".
S. Grimme, J. Antony, S. Ehrlich and H. Krieg, The Journal of Chemical Physics, 2010, 132, 154104, "A consistent and accurate ab initio parametrization of density functional dispersion correction (DFT-D) for the 94 elements H-Pu".
Z. Huang, P. Thomson and S. Di, Journal of Physics and Chemistry of Solids, 2007, 68, 530-535, "Lattice contractions of a nanoparticle due to the surface tension: A model of elasticity".
J. K. Nørskov, J. Rossmeisl, A. Logadottir, L. Lindqvist, J. R. Kitchin, T. Bligaard and H. Jonsson, The Journal of Physical Chemistry B, 2004, 108, 17886-17892, "Origin of the Overpotential for Oxygen Reduction at a Fuel-Cell Cathode".
R. Jinnouchi, K. K. T. Suzuki and Y. Morimoto, Catalysis Today, 2016, 262, 100-109, G.-F. Wei and Z.-P. Liu, Physical Chemistry Chemical Physics, 2013, 15, 18555-18561, "DFT calculations on electro-oxidations and dissolutions of Pt and Pt?Au nanoparticles".
A. Khorshidi and A. A. Peterson, Computer Physics Communications, 2016, 207, 310-324, "Amp: A modular approach to machine learning in atomistic simulations".
H. Larsen, J. J. Mortensen, J. Blomqvist, I. E. Castelli, R. Christensen, M. Dulak, J. Friis, M. N. Groves, B. Hammer and C. Hargus, Journal of Physics: Condensed Matter, 2017, 29, 273002, "The atomic simulation environment?a Python library for working with atoms".
J. Behler and M. Parrinello, Physical Review Letters, 2007, 98, 146401, "Generalized Neural-Network Representation of High-Dimensional Potential-Energy Surfaces".
G. Broyden, IMA Journal of Applied Mathematics, 1970, 6, 76-90, "The Convergence of a Class of Double-rank Minimization Algorithms 1. General Considerations".
R. Fletcher, The Computer Journal, 1970, 13, 317-322, "A new approach to variable metric algorithms".
Goldfarb, Mathematics of Computation, 1970, 24, 23-26, "A Family of Variable-Metric Methods Derived by Variational Means".
B. Han, A. Van der Ven, G. Ceder and B.-J. Hwang, Physical Review B, 2005, 72, 205409, "Surface segregation and ordering of alloy surfaces in the presence of adsorbates".
Joonhee Kang et al, "First-principles database driven computational neural network approach to the discovery of active ternary nanocatalysts for oxygen reduction reaction", Physical Chemistry Chemical Physics, vol. 20, Issue 38, Oct. 14, 2018, pp. 24499-25108.
Liu Zhipan et al., "Large-scale atomic simulation package (LSASP): Program and Progress", Science Foundation of China, Jan. 15, 2018, pp. 95-100 & its English abstract.

* cited by examiner

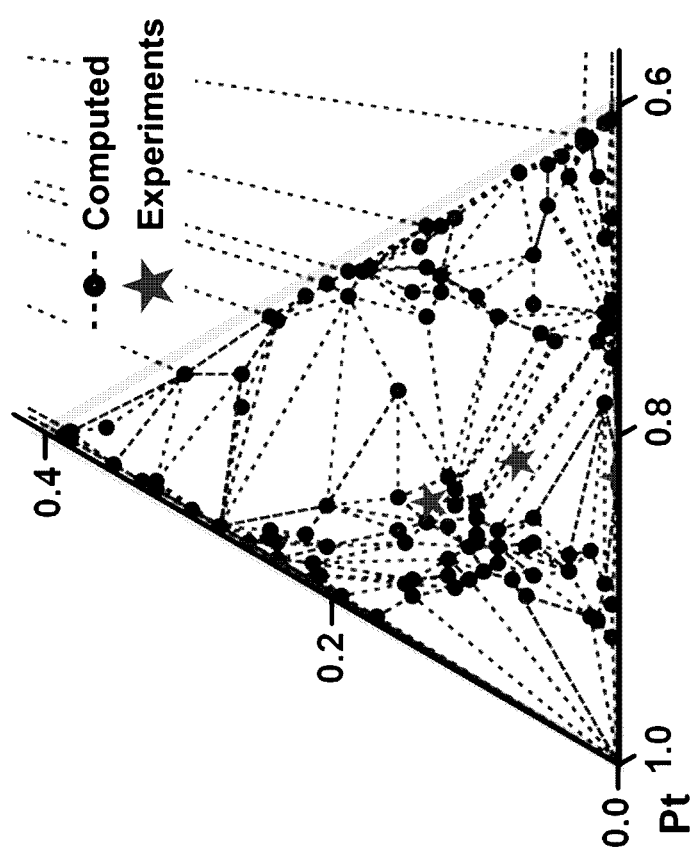

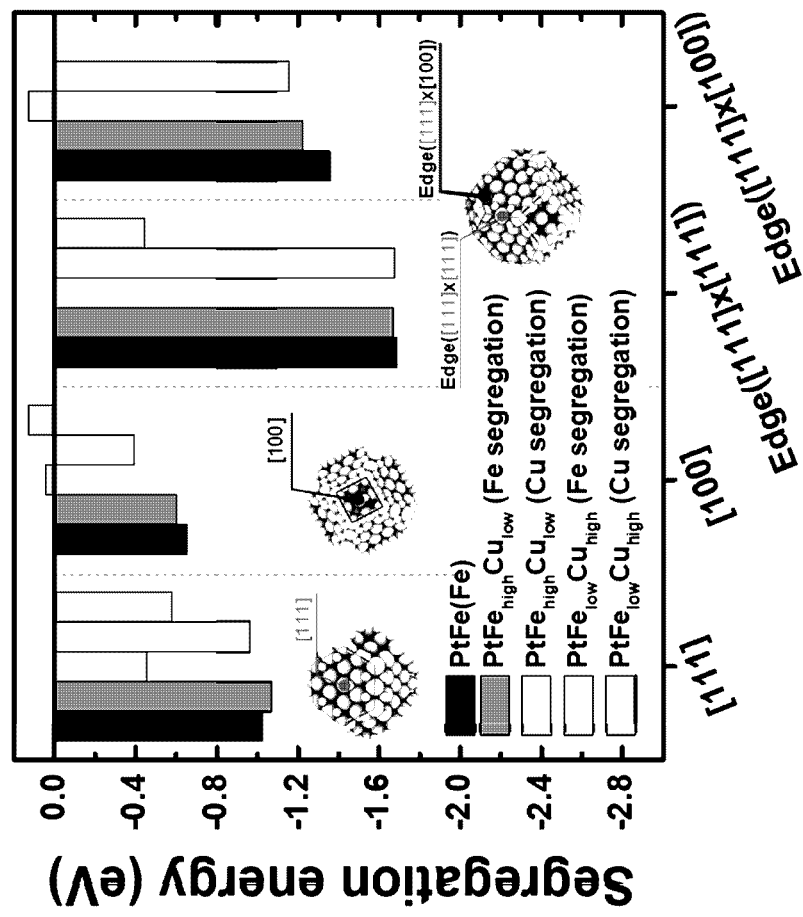

METHOD FOR DESIGNING TERNARY CATALYST USING MACHINE LEARNING

CROSS-REFERENCE TO RELATED APPLICATION

This application claims priority to and the benefit of Korean Patent Application No. 10-2021-0037961 filed in the Korean Intellectual Property Office on Mar. 24, 2021, the entire contents of which are incorporated herein by reference.

TECHNICAL FIELD

The present invention relates to a method of designing a ternary catalyst using machine learning, and more particularly, to a method of designing a PtFeCu catalyst for an oxygen reduction reaction of a fuel cell.

BACKGROUND

Proton exchange membrane (PEM) fuel cells show great potential as systems that directly convert renewable fuels into electrochemical energy. Compared with conventional combustion engines, it is more environmentally friendly and has improved efficiency. Developed countries have already commercialized hydrogen electric vehicles equipped with PEM fuel cells, which have a greater mileage per fuel charge than lithium-ion powered vehicles.

The PEM fuel cells face several urgent challenges such as a high material cost, significantly slow electrochemical conversion of fuels, short system durability, insufficient charging station infrastructure, and the like.

The first two problems are mainly caused by an expensive Pt catalyst of commercially available PEM fuel cells. The Pt catalyst is structurally severely degraded by high overpotential for an electrochemical oxygen reduction reaction (ORR) at a cathode and by coagulation or dissolution during the fuel cell operation. Over the past decades, significant collaborations to develop a catalyst capable of lowering the overvoltage have been undertaken.

For example, various nanoscale alloys have been proposed to accomplish a synergistic effect. Some binary Pt alloys (M=Cu, Fe, Co, Ni, Y, and the like in Pt-M) have been extensively examined with respect to ORR catalyst performance.

However, PtFe nanoparticles have better ORR catalyst performance than pure Pt due to weak OH binding energy on the surface and the like. For example, $PtCu_3$ and PtCo exhibit excellent ORR catalyst performance. However, the Pt-M binary nano catalysts are structurally decomposed during long-term electrochemical cycling.

Several studies on introducing a third component into Pt-M binary nano catalysts to additionally adjust the ORR catalyst performance and stability in an acidic medium and using Pt-based ternary nanoparticles for the ORR catalyst performance have been reported.

In the Pt-based ternary nanoparticles, the stoichiometric number of each component is important to achieve optimal oxygen binding energy for ORR catalytic activity. However, since both experimental and computational methods are difficult to work with, compositions and configurations of ternary alloys have not yet been extensively explored.

For example, a general quantum chemistry-based material design technique proceeds with a material design under assumption that experimental composition and structure are based on bulk structure information. However, actual nanoparticle materials have different bulks, structures, and properties, resulting in errors between calculations and experiments.

Specifically, structure calculation of existing alloy catalysts may not consider their actual particle sizes and takes a long time. Since an experimentally synthesizable and stable structure may be found by searching through millions of structures, there is a limit to actually predicting the stable structure, and accordingly, an experimental prediction error through calculation clearly occurs.

Accordingly, in order to overcome the shortcomings of the conventional catalyst design method based on the bulk structure information, a calculation process based on a stable structure is required.

SUMMARY

In preferred aspects, provided is a method for manufacturing, by designing, a ternary catalyst for an oxygen reduction reaction that can save cost and time by finding a catalyst that can be synthesized experimentally using machine learning and screening its performance in advance to minimize candidates for experimental testing.

In an aspect, provided is a method for manufacturing a ternary catalyst for oxygen reduction reaction. The method may include first step of constructing a database including catalytic activity of oxygen reduction reaction (ORR) of PtFeCu nanoparticles using machine-learning-based neural network potential (NNP), a second step of determining thermodynamically stable PtFeCu nanoparticles through Monte Carlo calculation, and a third step of selecting a type of the PtFeCu nanoparticles for the ternary catalyst by analyzing the structure of PtFeCu nanoparticles.

In the first step, the neural network potential may be constructed by machine-learning parameters of atomic interaction energies by density functional theory (DFT) calculation.

The training set for machine-learning may be composed of atomic local environments with different morphologies, sizes, compositions, or configurations in which PtFeCu nanoparticles are divided by cut-off radius size.

The atomic local environments may include about 100 to 300 cuboctahedron random structures having a particle size of less than or equal to about 1.5 nm, 10 to 20 cuboctahedron random structures having a particle size of less than or equal to about 2.0 nm, 100 to 300 truncated octahedron random structures having a particle size of less than or equal to about 1.1 nm, and 50 to 150 truncated octahedron random structures having a particle size of less than or equal to about 1.7 nm.

The catalytic activity of the oxygen reduction reaction of the PtFeCu nanoparticles may be calculated by Equation 2.

$$\Delta G = \Delta E + \Delta ZPE - T\Delta S - neU \qquad \text{[Equation 2]}$$

In Equation 2, $\Delta G$ is the free energy of ORR, $\Delta E$ is a change in internal energy of the reaction obtained by DFT calculation, $\Delta ZPE$ and $\Delta S$ are changes in zero point energy and vibration entropy, respectively, U is an electrode potential relative to the standard hydrogen electrode, and n is the number of electrons participating in the reaction.

In the second step, the Monte Carlo calculation for each PtFeCu nanoparticle may be composed of n attempts of randomly exchanging atomic positions, and may be performed in about 10,000 trials at a temperature T (about 0 Kelvin or greater).

The second step may be performed by mapping the calculated density functional theory (DFT) of PtFeCu nanoparticles to a ternary phase diagram, and expressing the Monte Carlo calculation result as an energy convex hull on the ternary phase diagram.

In the third step, in order to configure the PtFeCu nanoparticles including the Pt shell, a Pt content based on a total weight of the PtFeCu nanoparticles may be set to be greater than or equal to about 0.6 by atomic fraction.

In the third step, the structure of the PtFeCu nanoparticles may be analyzed by analyzing the number of atoms of Pt, Fe, and Cu in each atomic shell of the PtFeCu nanoparticles.

In the third step, the chemical stability of the PtFeCu nanoparticles may be evaluated by Equation 7.

$$E_{seg}=E(Pt_mFe_nCu_l)_{seg}-E(Pt_mFe_nCu_l)_{initial} \quad \text{[Equation 7]}$$

In Equation 7, $E_{seg}$ is a surface separation energy of the alloy component induced by adsorption of oxygen atoms, $E(Pt_mFe_nCu_l)_{seg}$ and $E(Pt_mFe_nCu_l)_{initial}$ are total energies of $Pt_mFe_nCu_l$ with or without surface separation, respectively, and m, n, and i are the number of atoms of Pt, Fe, and Cu in the PtFeCu nanoparticles, respectively.

The method may further include a fourth step of synthesizing the selected PtFeCu nanoparticles, for example, through an experiment, and comparing and verifying them.

The composition of the PtFeCu nanoparticles obtained by the method of designing a ternary catalyst for an oxygen reduction reaction may be $Pt_{0.78}Fe_{0.09}Cu_{0.13}$ or $Pt_{0.78}Fe_{0.15}Cu_{0.07}$.

The method of manufacturing a ternary catalyst for an oxygen reduction reaction according various exemplary embodiments may reduce cost and time by finding a catalyst that can be synthesized experimentally using machine-learning and screening performance in advance to minimize candidates for experimental testing.

In particular, the method of manufacturing a ternary catalyst for an oxygen reduction reaction according to various exemplary embodiments may be useful for searching excellent materials at a faster speed of 6 million times or more than the existing quantum mechanics calculation and at least 100 times faster than the existing computational simulation method. In the system catalyst, the optimum composition that can improve the performance and durability of the catalyst may be obtained, and an experiment roadmap may be built based on the candidates that are expected to have excellent durability and performance obtained through calculation so that the research can be conducted efficiently.

Other aspects of the invention are disclosed infra.

BRIEF DESCRIPTION OF THE DRAWINGS

FIG. 2A shows the number of atoms in the primary shell; FIG. 2B shows the number of atoms in secondary shell; and FIG. 2C shows the number of atoms in (C) tertiary shell of truncated ternary PtFeCu nanoparticles having a particle size of 2.0 nm. In addition, FIG. 2D shows the atomic fractions of Pt, FIG. 2E shows the atomic fractions of Fe.

FIGS. 3A-3F show thermodynamic ternary diagrams and spectroscopic properties of Pt- based ternary nanoparticles. In particular, FIG. 3A shows an exemplary ternary diagram; FIG. 3B shows convex hull points of ternary PtFeCu nanoparticles (2.0 nm) within the atomic fraction range of 0.6<Pt <1; FIG. 3C shows an XRD pattern; FIG. 3D shows structure information of representative compositions of PtFe and PtFeCu nanoparticles; FIG. 3E shows STEM-EDS mapping and FIG. 3F shows a STEM-EDS line profile. In FIG. 3B, orange stars indicate synthesized compositions, and in FIG. 3C, a dotted line indicates (111) peaks of Pt (JCPDS No. 04-0802).

FIG. 4A shows an exemplary catalytically active volcano calculated for ORR through d-band central energy of Pt; FIG. 4B shows element distributions in sub-shells (secondary shells) of 2.0 nm PtFe and PtFeCu nanoparticles; FIG. 4C shows CV; and FIG. 4D shows LSV curves for ORR.

FIGS. 5A-5D show electrochemical and chemical stability of the pure (Pt), binary (PtFe), and ternary (PtFeCu) nanoparticles. In particular, FIG. 5A shows separation energy of each catalyst in the DFT calculation, FIG. 5B shows atomic fractions of primary and secondary shells of PtFe, $PtFe_{high}Cu_{low}$, and $PtFe_{low}Cu_{high}$ 4 nm nanoparticles; FIG. 5C shows ECSA; and FIG. 5D shows mass activity at 0.9 V (vs. RHE) before and after AST 30k.

DETAILED DESCRIPTION

Figure 1:
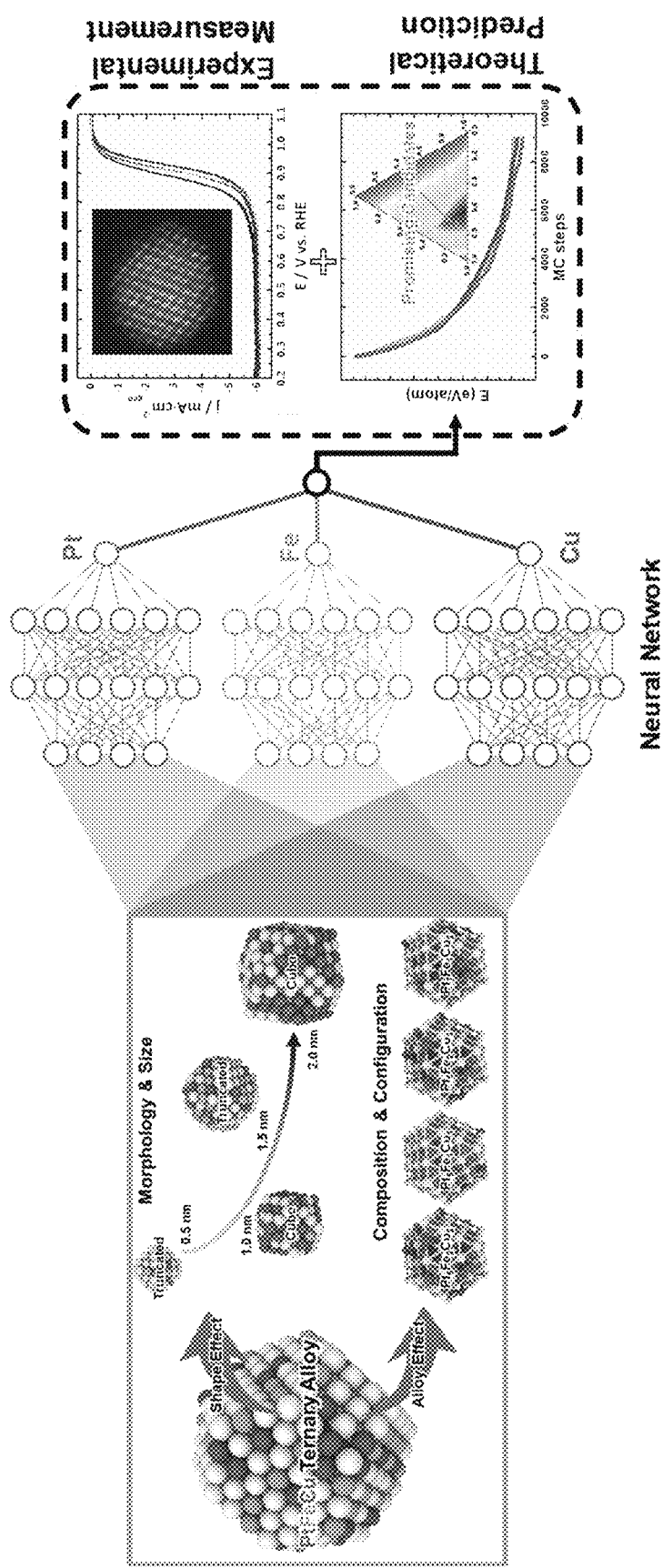
FIG. 1 shows an exemplary ternary alloy configuration search and theoretical prediction and experimental verification for ORR.

Advantages and features of the present disclosure and methods of accomplishing the same may be understood more readily by reference to the following detailed description of preferred embodiments and the accompanying drawings. However, this disclosure may be embodied in many different forms and is not to be construed as limited to the embodiments set forth herein. Unless otherwise defined, all terms (including technical and scientific terms) used herein have the same meaning as commonly understood by one of ordinary skill in the art. The terms defined in a generally-used dictionary may not be interpreted ideally or exaggeratedly unless clearly defined. Throughout the specification, unless explicitly described to the contrary, the word "comprise", and variations such as "comprises" or "comprising", will be understood to imply the inclusion of stated elements but not the exclusion of any other elements.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Furthermore, the number of repeats of each step, process conditions, and the like, are not particularly limited as long as they do not impair the object of the present invention.

In addition, unless otherwise defined, all terms used herein, including technical or scientific terms, have the same meanings as commonly understood by those skilled in the art to which this invention pertains.

In an aspect, provided is a method of manufacturing a ternary catalyst for an oxygen reduction reaction that may include a first step of constructing a database on the oxygen reduction reaction (ORR) catalytic activity of PtFeCu nanoparticles, a second step of determining a composition of thermodynamically stable PtFeCu nanoparticles, and a third step of analyzing the structure of PtFeCu nanoparticles to select a stable structure.

In the first step, a database on the oxygen reduction reaction (ORR) catalytic activity of PtFeCu nanoparticles may be constructed using a machine-learning-based neural network potential (NNP). In order to efficiently obtain a neural network potential (NNP) of the ternary PtFeCu nanoparticles, shape effects such as morphology and size alloy effects such as a composition and a configuration may be separated, as shown in FIG. 1.

A database may be constructed to simulate a configurational space of the PtFeCu nanoparticles. The shape and alloy effects may be changed depending on a cut-off radius. As for larger nanoparticles, an atom environment thereof may be duplicated by local symmetry functions and applied to all the nanoparticles, but smaller nanoparticles may be exposed to a significantly different local environment. This may be adjusted by changing the cut-off radius in consideration of the local atomic environments. However, when the cut-off radius is small, lack of information occurs, when the cut-off radius is large, a computation cost enormously increases. For example, the cut-off radius may be set at 5 Å to ensure an atomic environment of the nearest neighboring atom.

In other words, a training set for machine-learning consists of atomic local environments where the PtFeCu nanoparticles may be divided depending on a cut-off radius and may have different morphology, size, composition, or configuration. For example, the atomic local environments may include about 100 to 300 cuboctahedron random structures having a particle size of less than or equal to about 1.5 nm, 10 to 20 cuboctahedron random structures having a particle size of less than or equal to about 2.0 nm, 100 to 300 truncated octahedron random structures having a particle size of less than or equal to about 1.1 nm, and 50 to 150 truncated octahedron random structures having a particle size of less than or equal to about 1.7 nm.

The neural network potential (NNP) may be constructed by machine-learning parameters of atomic interaction energies by density functional theory (DFT) calculation.

For example, Kohn-Sham density function theory (DFT) calculation implemented in VASP (Vienna Ab-initio Simulation Package) may be suitably used (G. Kresse and J. Furthmuller, Physical Review B, 1996, 54, 11169; J. Hafner, Journal of Computational Chemistry, 2008, 29, 2044-2078).

For the interaction between the core and electrons, Projector-Augmented Wave (PAW) pseudo-potentials may be used (P. E. Blochl, Physical Review B, 1994, 50, 17953).

All Kohn-Sham DFT equations may be calculated with energy and force conversions (convergences) of about $10^{-5}$ eV and about 0.05 eV·Å$^{-1}$, respectively, and the basis plane waves extend to a cut-off energy of about 520 eV.

An exchange-correlation function may be calculated by generalized gradient approximation (GGA) of Perdew-Burke Ernzerhof (PBE) or Revised Perdew-Burke-Ernzerhof (RPBE) (J. P. Perdew, K. Burke and M. Ernzerhof, Physical Review Letters, 1996, 77, 3865; B. Hammer, L. B. Hansen and J. K. Norskov, Physical Review B, 1999, 59, 7413).

Magnetism of PtFeCu may be obtained by considering spin polarization and van der Waals (vdW) interaction in a DFT-D3 method and initializing different magnetic moments of Fe (S. Grimme, J. Antony, S. Ehrlich and H. Krieg, The Journal of Chemical Physics, 2010, 132, 154104).

The calculation of the nanoparticles may be performed by adopting a F-point scheme, wherein a vacuum space of 10 Å may be guaranteed to ignore an interaction between periodic images.

The compositions and configurations of the nanoparticles may be randomly generated by using compressed lattice parameters in a bulk (0.975 bulk lattice) to incorporate a compression effect on optimization of the nanoparticles in vacuum (Z. Huang, P. Thomson, and S. Di, Journal of Physics and Chemistry of Solids, 2007, 68, 530-535). Each nanoparticle may be calculated as a single point.

The adsorption energy ($E_{ads}$) of the adsorbed material may be calculated by Equation 1.

$$E_{ads} = E_{NP+adsorbate} - E_{NP} - E_{adsorbate} \quad \text{[Equation 1]}$$

Herein, $E_{Np+adsorbate}$, $E_{NP}$, and $E_{adsorbate}$ are the total energy of adsorbate, nanoparticles, and nanoparticles with adsorbate, respectively.

The free energy (ΔG) of the ORR is calculated using Equation 2 to confirm the thermodynamic potential for the spontaneous ORR reaction.

$$\Delta G = \Delta E + \Delta ZPE - T\Delta S - neU \quad \text{[Equation 2]}$$

Herein, ΔE is a change in internal energy of the reaction obtained by DFT calculation, ΔZPE and ΔS are changes in zero point energy and vibration entropy, respectively, U is an electrode potential relative to the standard hydrogen electrode, and n is the number of electrons participating in the reaction.

The free energy diagram is plotted at pH=0, and the relevant ORR mechanisms of Equations 3 to 6 may be considered.

$$*+O_2+H^++e^- \rightarrow *OOH \quad \text{[Equation 3]}$$

$$*OOH+H^++e^- \rightarrow *O+H_2O \quad \text{[Equation 4]}$$

$$*O+H^++e^- \rightarrow *OH \quad \text{[Equation 5]}$$

$$*OH+H^++e^- \rightarrow *H_2O \quad \text{[Equation 6]}$$

The reaction free energy of ORR may be calculated from the experimental value of the reaction of $O_2+2H_2 \rightarrow 2H_2O$, ΔG=−4.92 eV at 298.15 K and 0.035 bar (J. K. Norskov, J. Rossmeisl, A. Logadottir, L. Lindqvist, J. R. Kitchin, T. Bligaard and H. Jonsson, The Journal of Physical Chemistry B, 2004, 108, 17886-17892).

All oxygen intermediates may be absorbed on the (111) surface of a nanoparticle model, which is passivated by oxygen at the edges and vertices, and the most frequent site appearing on the surface is selected as an adsorption site (R. Jinnouchi, K. K. T. Suzuki and Y. Morimoto, Catalysis Today, 2016, 262, 100-109, G.-F. Wei and Z.-P. Liu, Physical Chemistry Chemical Physics, 2013, 15, 18555-18561).

A neural network potential (NNP) may be constructed by using an atomic simulation environment (ASE) and an atomic machine-learning package (AMP) (A. Khorshidi and A. A. Peterson, Computer Physics Communications, 2016, 207, 310-324; A. H. Larsen, J. J. Mortensen, J. Blomqvist, I. E. Castelli, R. Christensen, M. Dulak, J. Friis, M. N. Groves, B. Hammer and C. Hargus, Journal of Physics: Condensed Matter, 2017, 29, 273002).

Gaussian descriptors of radial and angular symmetry functions ($G^2$ and $G^4$) proposed by Behler are used (J. Behler and M. Parrinello, Physical Review Letters, 2007, 98, 146401). Local symmetries are considered within the range of 5 Å. Various parameter sets of $G^2$ and $G^4$ may be used to obtain a total of 108 symmetric functions as a unique vector for each atom species, which are used in an input layer of a neural network.

An activation function between hidden layers may be a hyperbolic tangent, and the potential may be trained until a root mean square error (RMSE) is less than 1 meV·atom$^{-1}$ through an Broyden-Fletcher-Goldfarb-Shanno (BFGS) algorithm (C. G. Broyden, IMA Journal of Applied Mathematics, 1970, 6, 76-90; R. Fletcher, The Computer Journal, 1970, 13, 317-322; D. Goldfarb, Mathematics of Computation, 1970, 24, 23-26).

In order to efficiently train the potential while maintaining a test RMSE of 10 meV·atom$^{-1}$, different hyperparameters of the number of nodes and the hidden layers are tested at 40-30-20-10 and 15-15.

In the second step, thermodynamically stable PtFeCu nanoparticles may be determined or selected through Monte Carlo calculation.

In order to search a thermodynamically stable configuration as a function of an alloy composition, a Monte Carlo (MC) simulation may be performed in a grand canonical ensemble scheme.

Each MC step includes n attempts to exchange atom positions, which are randomly selected according to Metropolis's algorithm (B. Han, A. Van der Ven, G. Ceder, and B.-J. Hwang, Physical Review B, 2005, 72, 205409). All simulations are 10,000 trials performed at a temperature T (0 Kelvin or higher), ignoring thermal effects.

In the third step, a type of PtFeCu nanoparticles that may be suitable for the ternary catalyst may be determined or selected through a structure analysis thereof.

The structure analysis of the PtFeCu nanoparticles may be performed by analyzing the number of Pt, Fe, and Cu atoms in each atomic shell of the PtFeCu nanoparticles.

In addition, in the third step, the chemical stability of the ternary PtFeCu nanoparticles may be evaluated by calculating the surface segregation energy ($E_{seg}$) of the alloy component induced by the adsorption of oxygen atoms using Equation 7 to select nanoparticles.

$$E_{seg} = E(Pt_m Fe_n Cu_l)_{seg} - E(Pt_m Fe_n Cu_l)_{initial} \quad \text{[Equation 7]}$$

In Equation 7, $E_{seg}$ is an surface separation energy of the alloy component induced by adsorption of oxygen atoms, $E(Pt_m Fe_n Cu_l)_{seg}$ and $E(Pt_m Fe_n Cu_l)_{initial}$ are total energies of $Pt_m Fe_n Cu_l$ with or without surface separation, respectively, and m, n, and i are the number of atoms of Pt, Fe, and Cu in the PtFeCu nanoparticles, respectively. Herein, the lower the separation energy, the easier the separation occurs.

EXAMPLE

Hereinafter, a process of selecting the PtFeCu nanoparticles through the second and third steps will be described with specific examples.

First, cut octahedron 2.0 nm ternary PtFeCu nanoparticles were searched within the atomic fraction range of 0.6<Pt<1 by using parameterized NNP. In order to form the PtFeCu nanoparticles including a Pt shell, a Pt content was set to 0.6 as an atomic fraction or more based on a total weight of the PtFeCu nanoparticles.

The atomic fraction is a ratio of the number of each atom to the total number of all atoms, for example, the atomic fraction of Pt may be calculated by (the number of Pt atoms)/(the total number of Pt, Fe, and Cu atoms).

As shown in FIG. 2, the most thermodynamically stable composition among various alloy compositions were confirmed through an MC simulation along the Pt composition line.

Figure 2A:
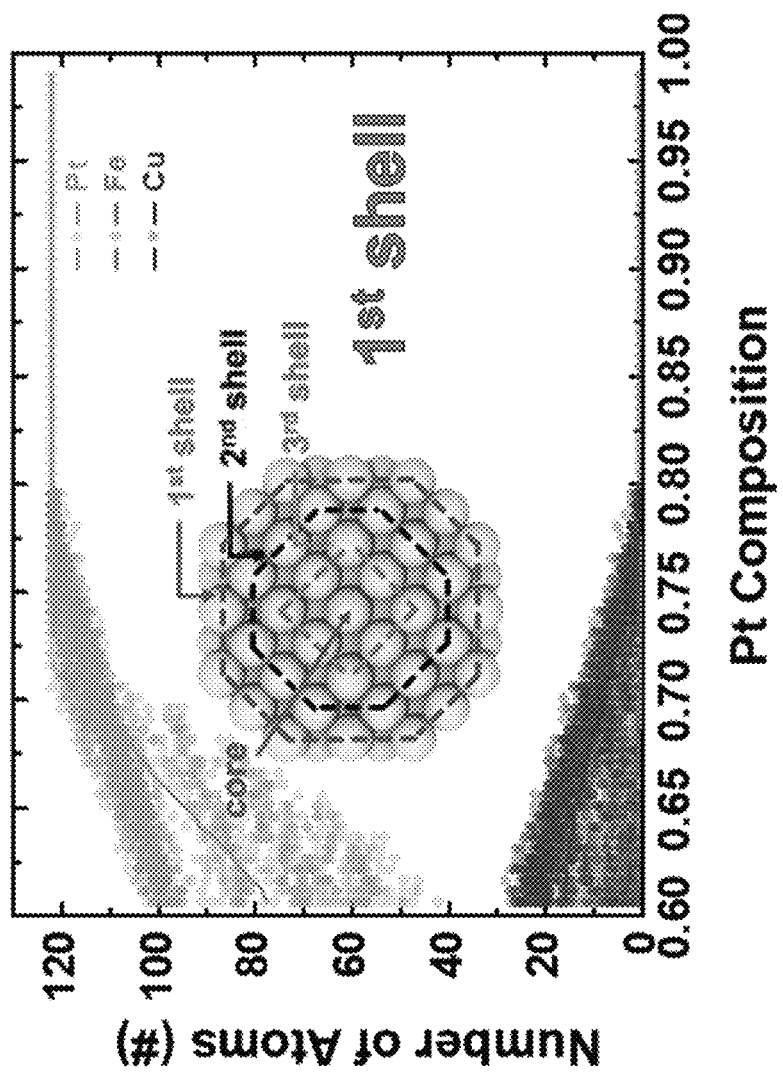
FIGS. 2A-2E show a configuration space of an exemplary ternary PtFeCu nanoparticles having a size of 2.0 nm in the atomic fraction range of 0.6<Pt <1. In particular.
Figure 2B:
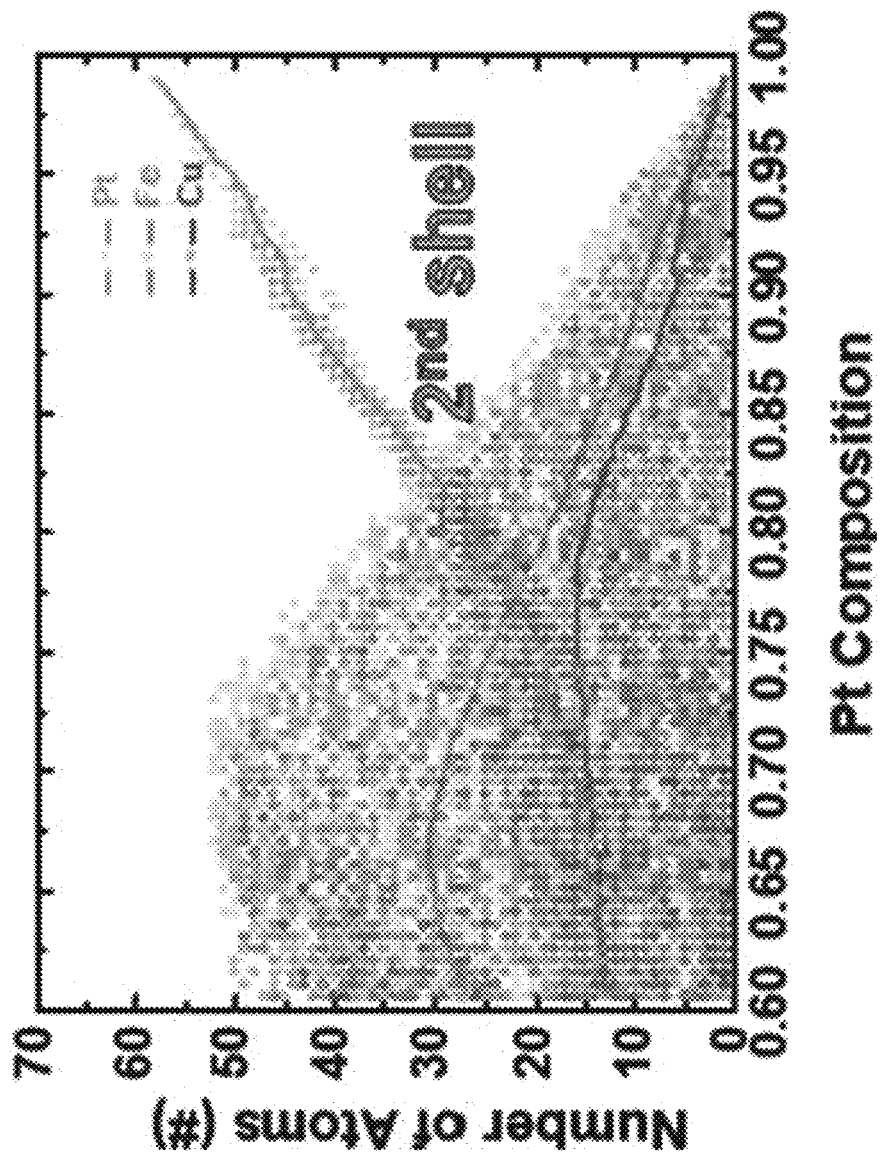
Figure 2C:
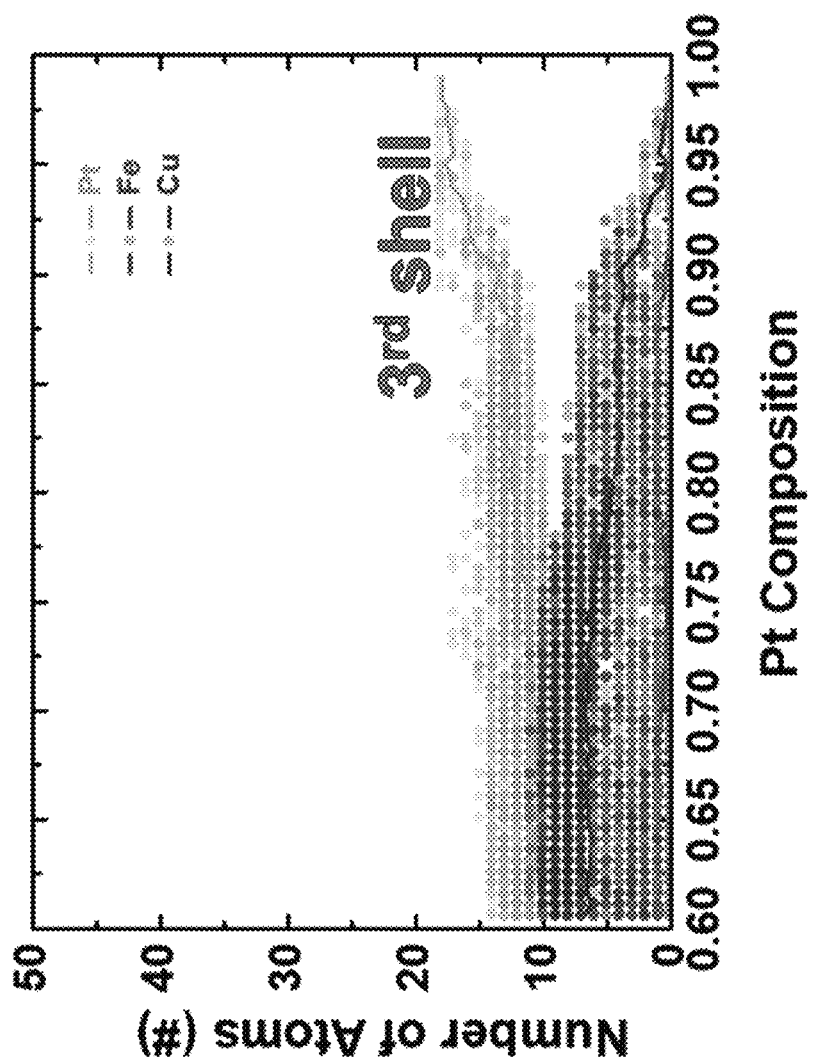

As shown in FIGS. 2A-2C, each alloying element prefers to occupy a specific shell.

The Pt atoms may be in the outermost (first) shell, while the Fe atoms may be in the second shell, and the Cu atoms may be more or less randomly dispersed over the inner shell of a nanoparticle.

Figure 2D:
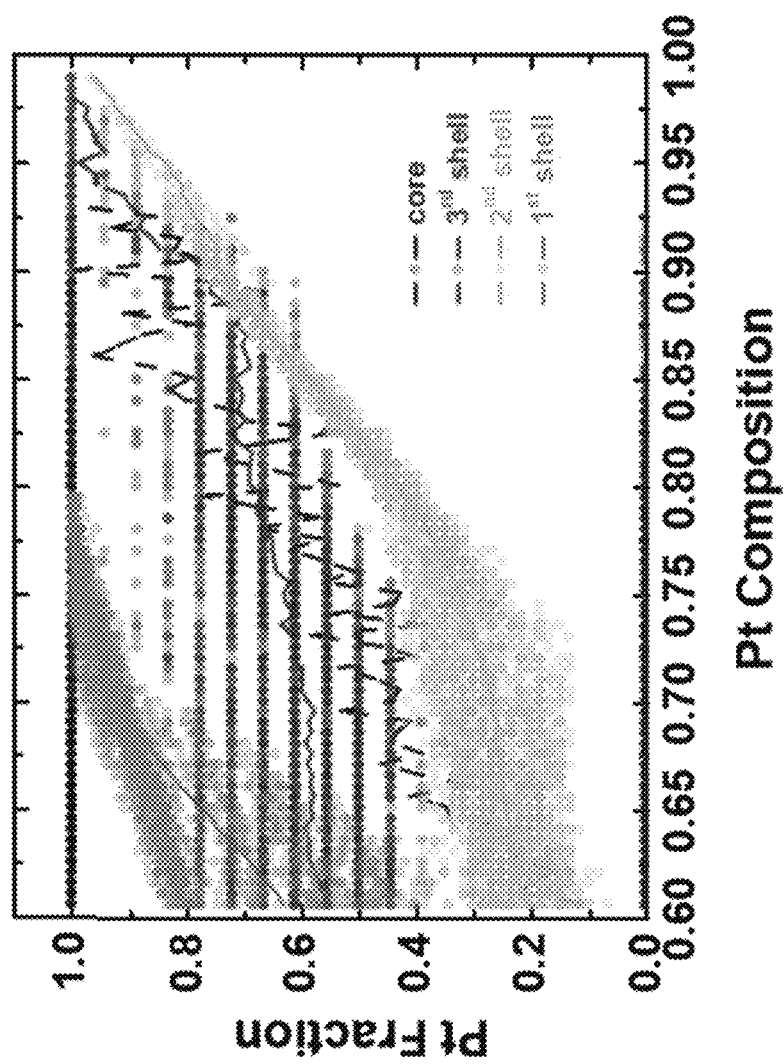
Figure 2E:
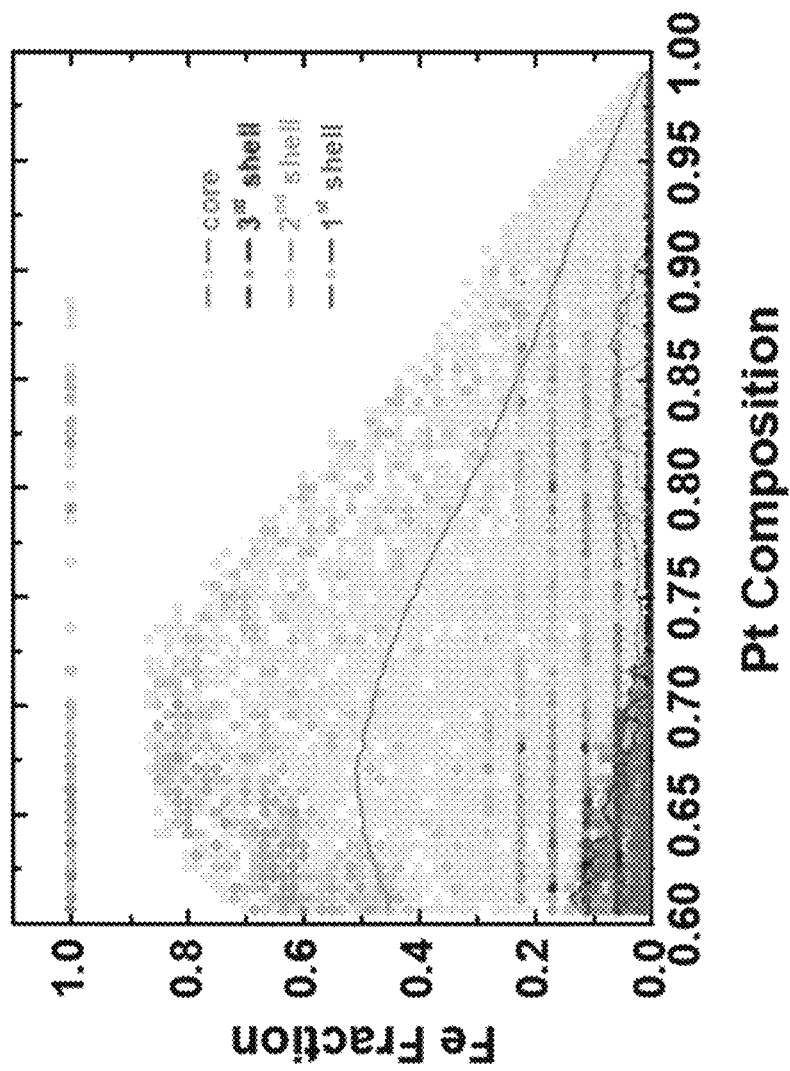

Pt of the ternary PtFeCu nanoparticles was subjected to compressive deformation by the smaller Fe atoms. FIGS. 2D-2E show the same trend as FIGS. 2A-2C.

In addition, these results were consistent with experimental observations of typical Pt-based alloy catalysts.

In the configurational analysis, the Pt content should be greater than or equal to the theoretical prediction (0.6 atomic fraction) to form ternary nanoparticles including a Pt shell.

This means that the ternary nanoparticles have subtle interactions, which may not be captured in terms of thermodynamic surface energy alone. Pt has the lowest surface energy among the three elements.

Furthermore, Fe may be more likely present in a subshell, and the three elements compete in a core site.

Figure 3A:
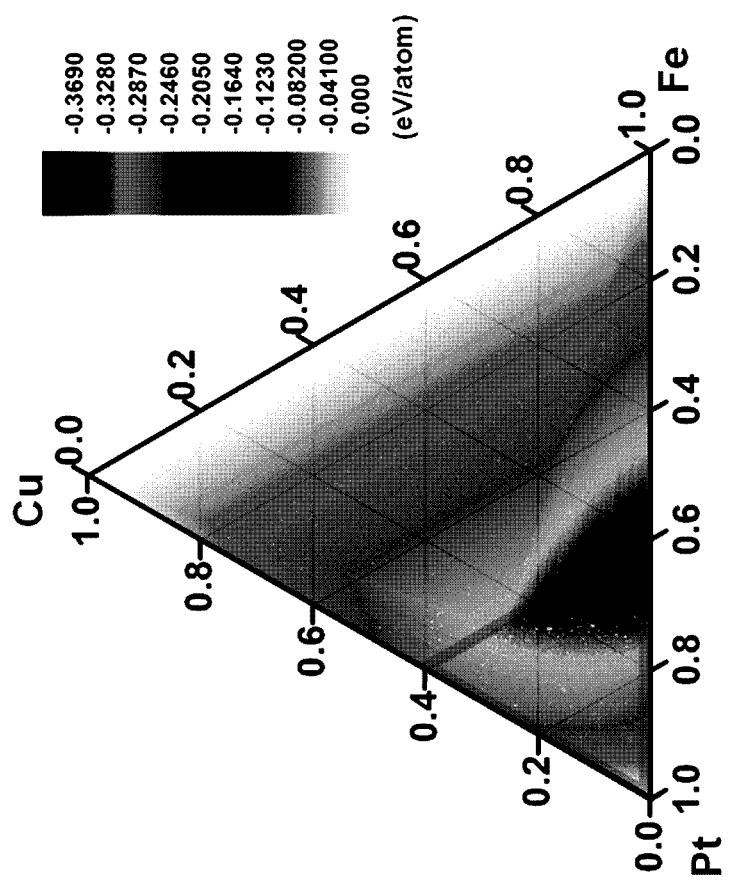

As shown in FIGS. 3A-3B, DFT of alloy PtFeCu nanoparticles was calculated to map a ternary phase diagram, wherein a ground state structure thereof is identified by an energy convex hull within the composition range of a 0.6<Pt<1.0 atomic fraction.

Most of hull points in Pt compositions of greater than a 0.8 atomic fraction show a structure of the Pt shell. In the Pt compositions of less than a 0.8 atomic fraction, Fe and Cu were distributed together in the primary shell.

Figure 2F:
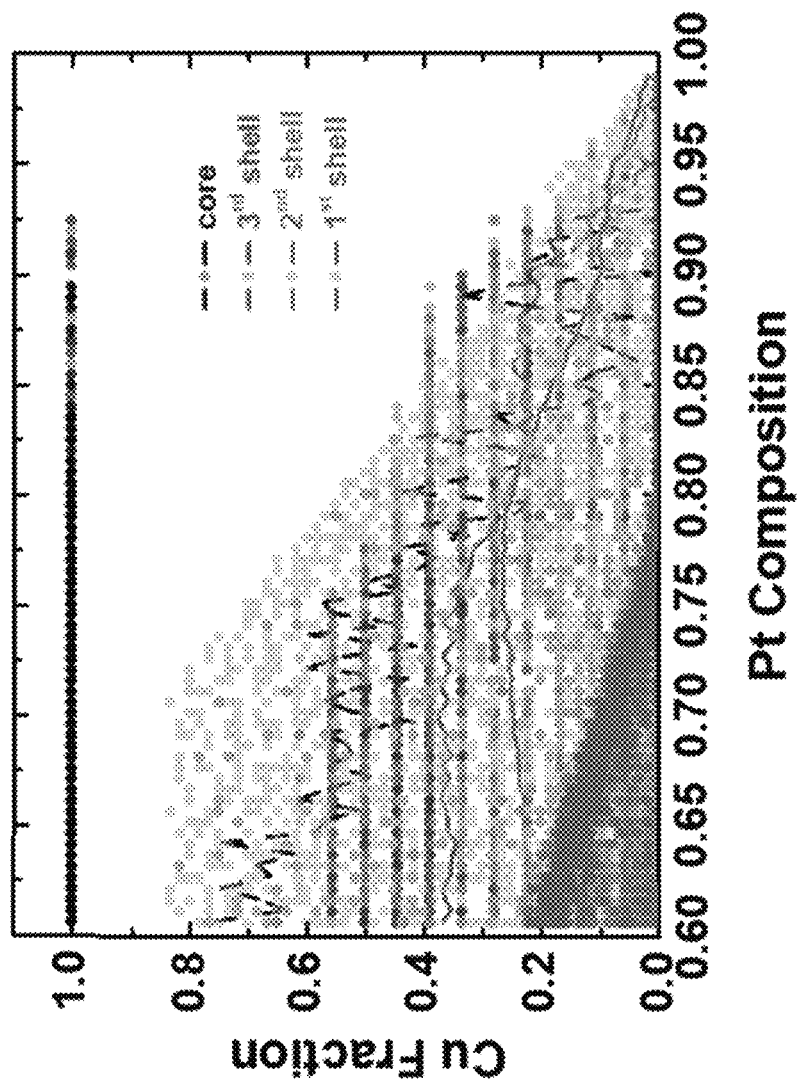
FIG. 2F shows the atomic fractions of Cu.

As shown in FIGS. 2D-2F, since each initial composition of Cu and Fe was a 0.80 atomic fraction and a 0.73 atomic fraction, Cu was more likely present in the primary shell than Fe.

In order to predict catalyst performance of the ternary PtFeCu nanoparticles for ORR, three different compositions, $Pt_{0.82}Fe_{0.18}$ (PtFe), $Pt_{0.82}Fe_{0.12}Cu_{0.06}$ (PtFe$_{high}$Cu$_{low}$), and $Pt_{0.8}Fe_{0.08}Cu_{0.12}$ (PtFe$_{low}$Cu$_{high}$), were selected. As shown in FIG. 3D, the selected compositions had a Pt skin structure and thermodynamically stable energy convex hull points.

As a Cu content is increased, Cu may be located in the outermost shell, limiting compositions of Cu.

Optionally, in the fourth step, the selected PtFeCu nanoparticles were synthesized through an experiment, and then compared and verified with calculated values.

Figure 3C:
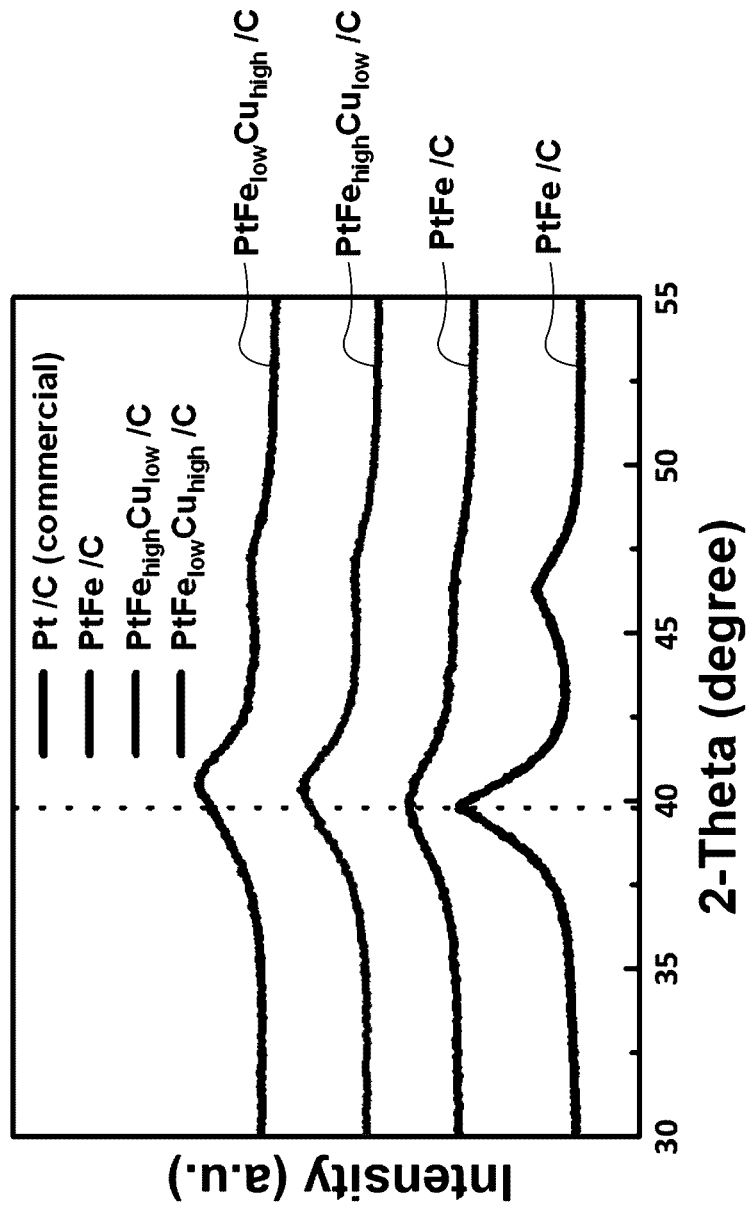
Figure 3D:
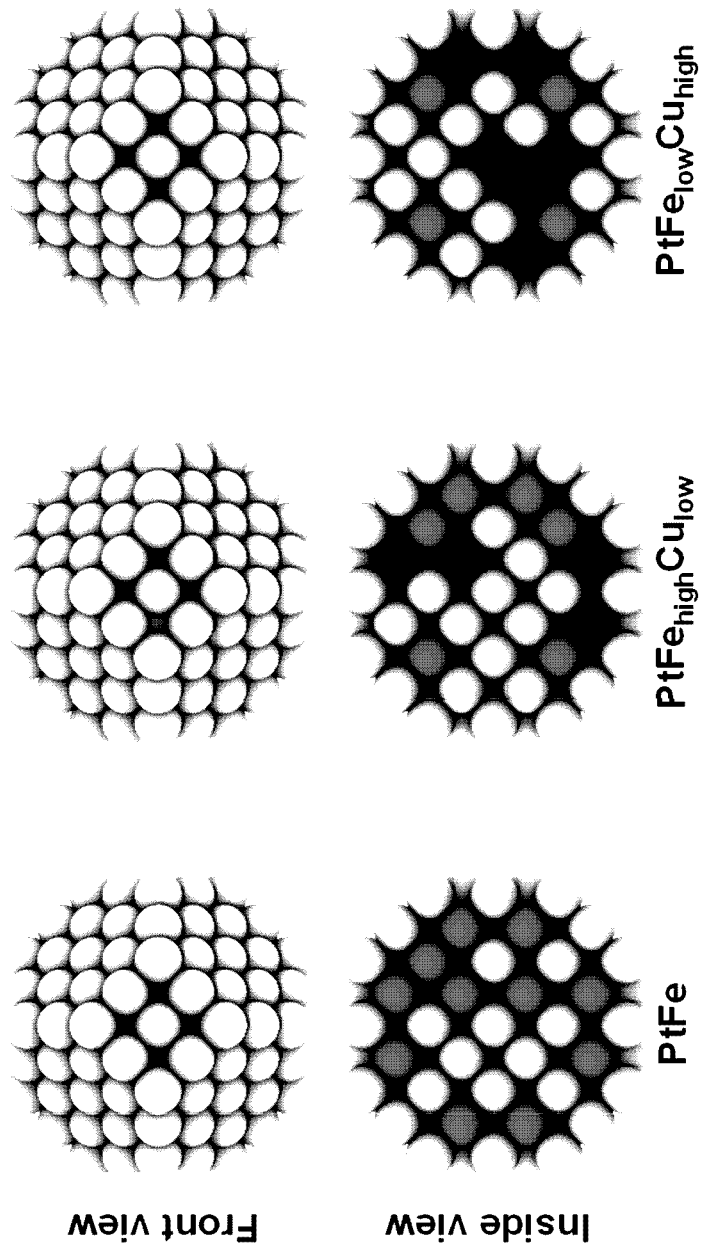

FIG. 3C shows the X-ray diffraction pattern and commercial Pt/C of the synthesized PtFe and PtFeCu catalysts.

All samples have the same face-centered cubic (fcc) structure as that of bulk Pt. In addition, no phase separation is observed in all regions. Furthermore, (111) peaks of PtFe and PtFeCu catalysts are shifted at a higher angle than a peak of Pt/C.

This means that relatively small Fe and Cu atoms are incorporated into a Pt lattice, causing the compressive deformation. Based on a Scherrer equation, each sample of $Pt_{0.83}Fe_{0.17}$ (PtFe), $Pt_{0.78}Fe_{0.15}Cu_{0.07}$ ($PtFe_{high}Cu_{low}$), and $Pt_{0.8}Fe_{0.09}Cu_{0.13}$ ($PtFe_{low}Cu_{high}$) is calculated to have crystal size of 2.1 nm, 2.2 nm, and 2.3 nm, respectively.

All the samples are highly dispersed on a carbon support and show a uniform particle size (less than or equal to 3 nm).

Figure 3E:
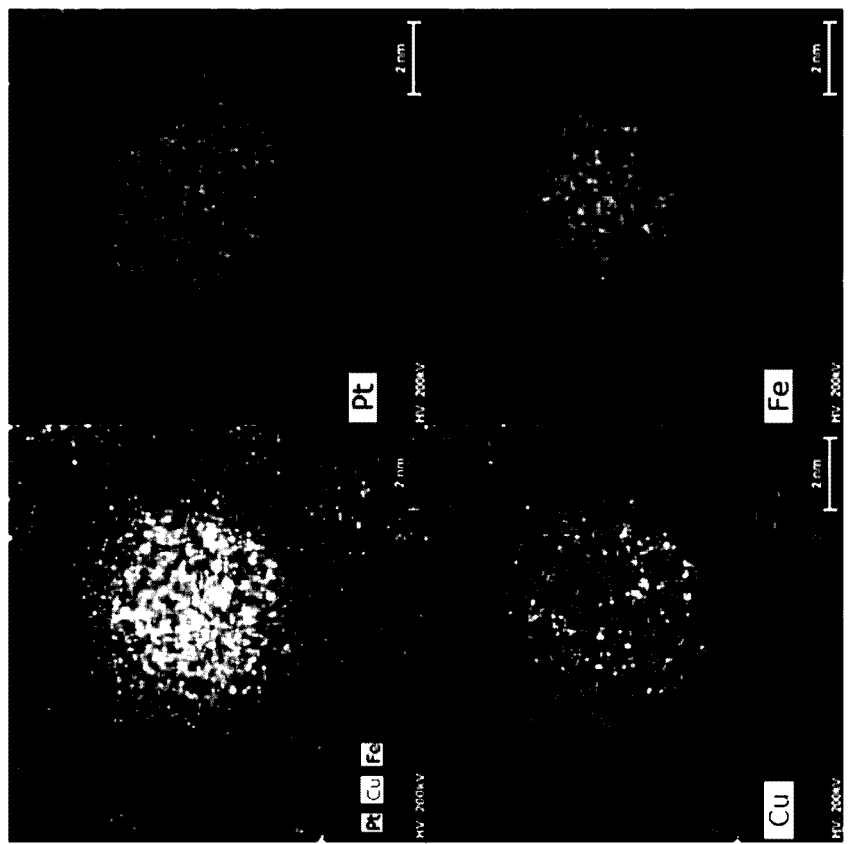

As shown in FIGS. 3D-3E, element distributions were analyzed to perform STEM-EDS mapping and line profiles scanned with a point resolution of 0.08 nm and thus examine composition information of the PtFe and PtFeCu nanoparticles.

As for the PtFe nanoparticles, Fe-K signals were observed in the core region, and Pt-M signals are observed throughout the nanoparticles.

The PtFe catalyst may be predicted to consist of about 1 to 2 Pt shell layers (about 0.3 nm to 0.5 nm) on the catalyst surface depending on a difference of the two profiles.

In addition, the PtFeCu catalyst had a core-shell structure regardless of the compositions.

Figure 3F:
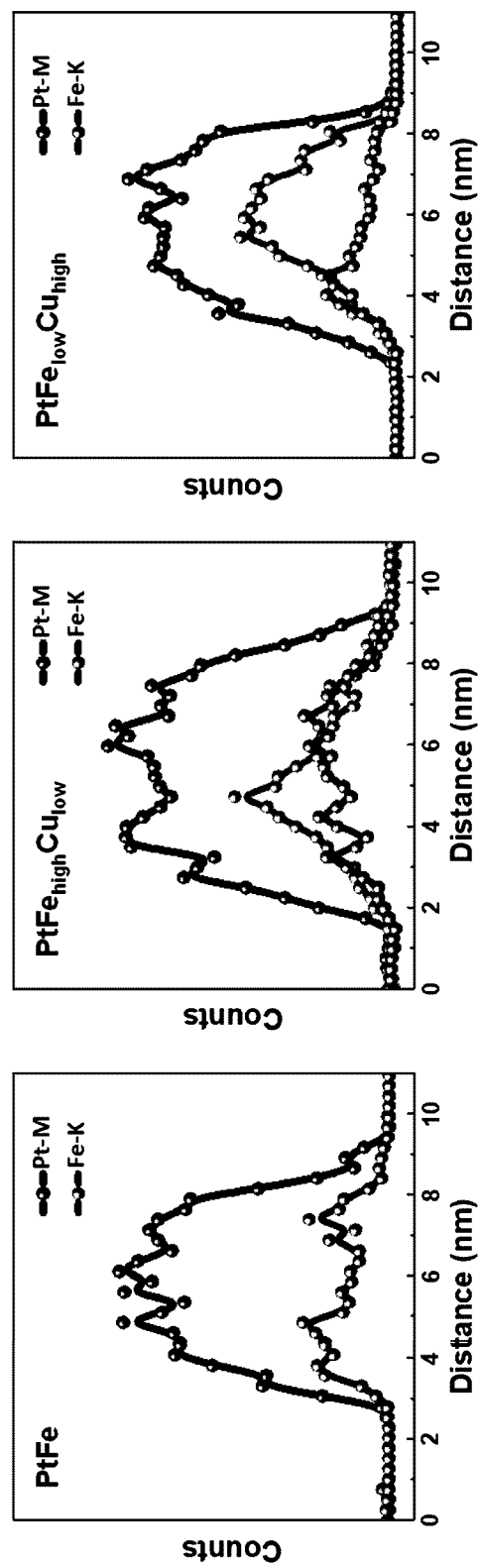

The core-shell structure was expected to be formed through sequential acid treatment and heat treatment during the synthesis. In addition, Cu atoms were distributed more outside the nanoparticles than Fe atoms (FIG. 3F).

The experimentally synthesized PtFeCu nanoparticles exhibited similar structure conditions such as particle size, composition, and element distribution. In other words, the experimental result was consistent with the computational model system.

For example, the PtFe catalyst may be synthesized by using a simple ultrasonically-assisted polyol method.

First, 2.6 mmol of $Pt(acac)_2$, 3.9 mmol of $Fe(acac)_3$, and 1.35 g of thermally-graphitized Ketjen black were dispersed at 600 J (1200° C.) in 100 mL of Ar-purged ethylene glycol (EG).

This precursor dispersion was irradiated with a solid horn-type ultrasonicator (tip diameter: 13 mm, amp. 40%, VCX-750, Sonic & Materials, Inc.). An ultrasonic wave reaction was performed for 4 hours at a temperature of 150° C.. or higher.

Then, the obtained dark slurry was sieved with a membrane filter (a pore size of 0.4 μm, Advantec Toyo Kaisha, Ltd.).

The obtained sample was washed several times with an excess amount of ethanol and deionized water to remove residual water and EG.

The obtained sample flake was dried at a temperature of 80° C.. in an oven overnight.

Then, the prepared sample was put in an alumina crucible and annealed at a temperature of 400° C.. for 2 hours under a mixture of $H_2$/Ar (v/v %=4/96).

The annealed sample was dispersed in ethanol and 0.1 M $HClO_4$ mixed in a ratio of ¼ (v/v %), and then acid-treated at a temperature of 94° C.. twice to remove undesirable residues such as $FeO_x$.

A ternary PtFeCu catalyst was synthesized through the same procedure as above except for a composition and a ratio of metal precursors. All the samples were synthesized at 2 g per batch.

Properties of the ternary PtFeCu catalyst were measured as follows.

An X-ray diffractometer (XRD, Buker D2 PHASER XE, Cu kα, $\lambda$=1.5406 Å) was used to measure a crystal structure thereof.

An element composition and Pt loading of the sample were measured by using an element analyzer (FlashEA 1112, ThermoFinnigan) and an inductively coupled plasma atomic emission spectroscope (ICP-AES, OPTIMA 4300 DV) and averaged.

Pt loading of a catalyst film in a rotation disk electrode (RDE) was evaluated with an X ray fluorescent analyzer (XRF, Hofriba, MESA-50).

Particle sizes and alloy element distributions of the sample were obtained through a Field Emission Transmission Electron Microscope (FM-TEM, FEI, Talos F200×, 200 kV) and Cs-corrected FE-TEM (FEI, Titan cubed G2 60-300, 300 kV).

In addition, electrochemical properties of the prepared ternary PtFeCu catalyst were measured as follows.

10 mg of a powder was dispersed in deionized water and isopropyl alcohol (IPA) (v/v %=4:1).

Subsequently, 10 μL of an ionomer dispersion (FSS-2, ASAHI GLASS Co., Ltd.) was added to the catalyst dispersion, and then sonicated with a bath-type device until a uniform catalyst ink is formed.

Subsequently, 13.3 μL of the catalyst ink was placed on a glassy carbon rotation disk electrode (RDE, 5.0 mm disk OD, 12.0 mm OD PTFE shroud, active region: 0.196 $cm^2$, Pine Research Instrumentation).

Pt loading for the glassy carbon was fixed at 20.4 $\mu g \cdot cm^{-2}$.

An electrochemical measurement was performed by using a three electrode battery system consisting of RDE coated with the catalyst as a working electrode, a reversible hydrogen electrode (RHE, Gaskatel GmbH) as a reference electrode, and a Pt wire as a counter electrode.

Before the measurement, RDE coated with the catalyst was 300 cycles washed in $N_2$-saturated 0.1 M $HClO_4$ with a potential of 0.03 V to 1.1 V (vs. RHE).

Cyclic voltammetry (CV) of each sample was recorded at a scan rate of 20 $mVs^{-1}$ in the solution.

A linear sweep voltagram (LSV) of each sample for ORR was measured in $O_2$-saturated 0.1 M $HClO_4$ at scan rates of 10 $mVs^{-1}$ and 1600 rpm within the potential range of 0.0 V to 1.1 V (vs. RHE).

An LSV curve was also measured under the same condition to remove a background current except for the $N_2$-saturated 0.1 M $HCLO_4$ solution.

IR compensation was performed by impedances measured at 0.7 V, 0.8 V, and 0.9 V during the ORR catalytic performance.

An accelerated stress test (AST) was performed by applying a square wave potential cycle between 0.6 V (3 s) and 0.95 V (3 s) at 30,000 (30 k) according to the US Department of Energy (DOE) protocol for electrocatalysts.

The catalyst performance was evaluated by mapping free energy diagrams of ORR about four nanoparticles, such as Pt, PtFe, $PtFe_{high}Cu_{low}$, and $PtFe_{low}Cu_{high}$. The performances of the four nanoparticles were obtained as overvoltages of 0.31 eV, 0.33 eV, 0.37 eV, and 0.45 eV in order of $PtFe_{high}Cu_{low}$>PtFe>$PtFe_{high}Cu_{low}$>Pt.

Figure 4A:
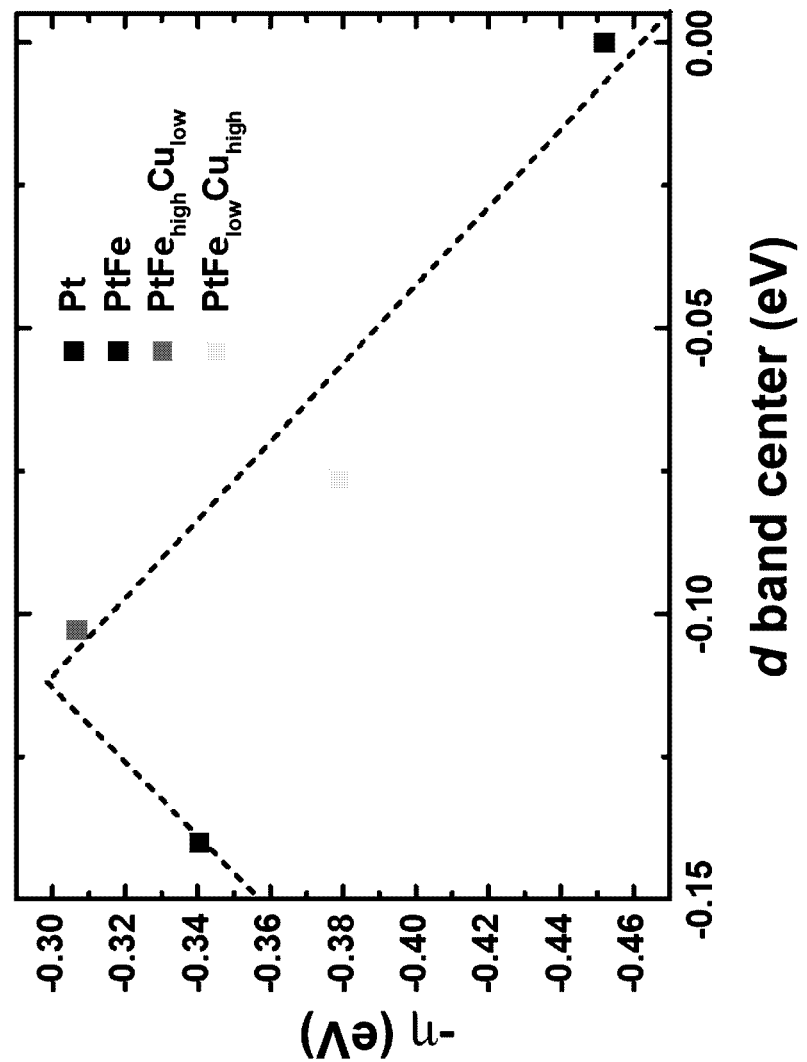
FIGS. 4A-4D show theoretical prediction and electrochemical performance of pure (Pt), binary (PtFe), and ternary (PtFeCu) nanoparticles. In particular.

This prediction coincides with d-band center energy of Pt, as shown in FIG. 4A. $PtFe_{high}Cu_{low}$ among the nanoparticles was at the top of the volcano due to optimal binding energy of an oxygen intermediate. Activity of Pt-based alloy nano catalysts may be controlled by a strain field formed by mixing nanoparticles with elements having different sizes.

This technology has a key function of finding an appropriate amount of strain for optimal binding energy. Accordingly, in order to tune the catalytic activity, it is important to control spatial distribution of the elements.

Figure 4B:
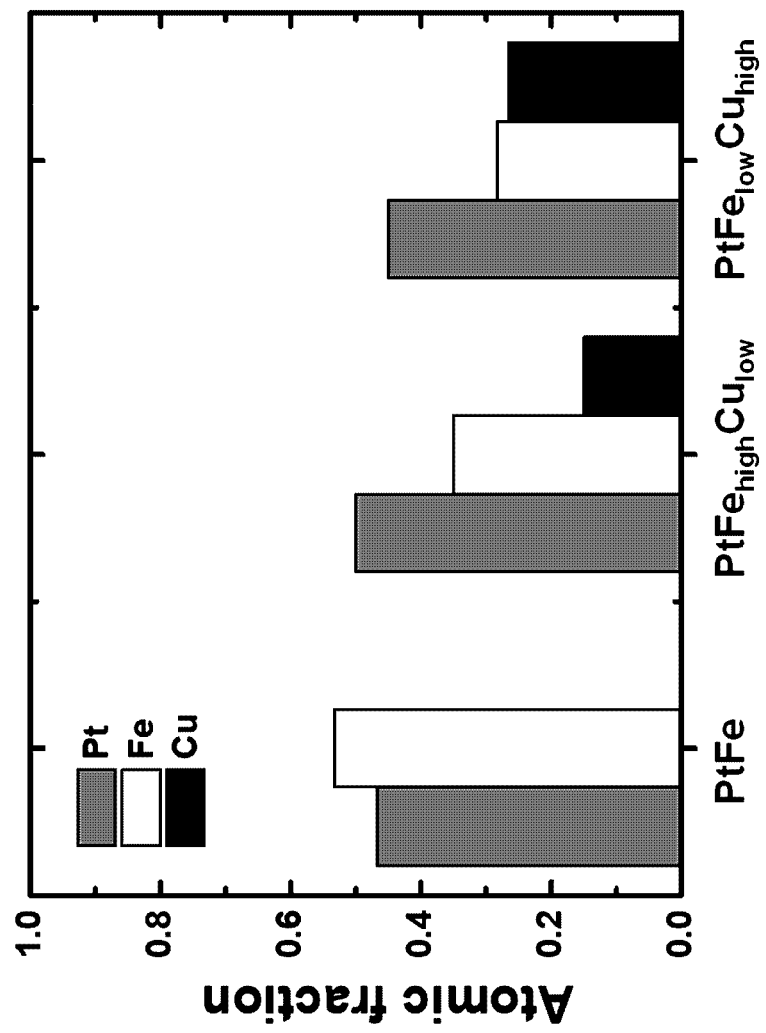

As shown in FIG. 4B, element distributions in secondary shells of PtFe, PtFe$_{high}$Cu$_{low}$, and PtFe$_{low}$Cu$_{high}$ were calculated. A compressive strain was mainly determined by Fe content in a secondary shell. In the secondary shell, a change in the Pt content rather slightly affected Cu replacing Fe. Resultantly, a small amount of Cu loading may optimize binding strength.

Figure 4C:
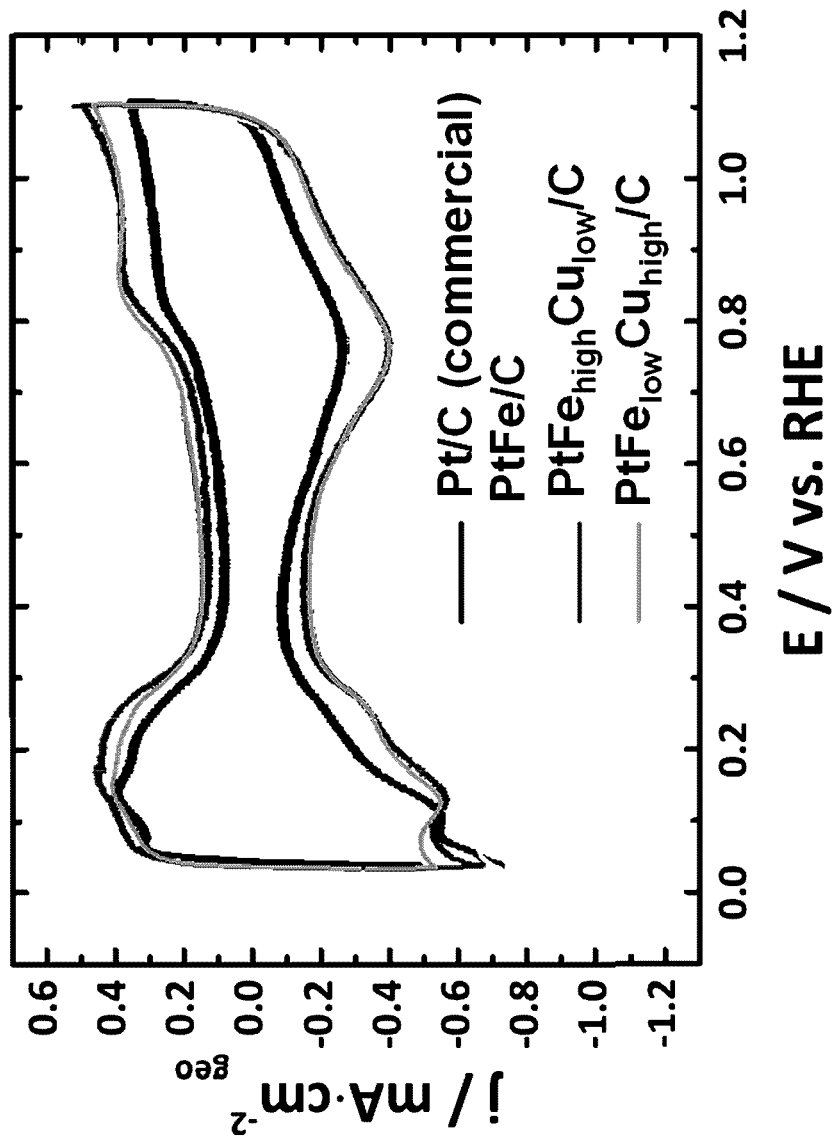

In order to verify this theoretical prediction, catalytic performance of the nanoparticles was measured by using a typical 3 electrode cell in an acidic medium. FIG. 4C shows a periodic voltage current diagram of a sample in N$_2$-saturated 0.1 M HClO$_4$ along with that of Pt/C.

PtFe$_{high}$Cu$_{low}$ and PtFe$_{low}$Cu$_{high}$ show a Cu dissolution peak at 0.7 V in the first cycle, but the peak immediately disappears. This provides evidence that Cu was dealloyed in the outermost shell.

Electrochemical surface areas (ECSA) of the samples were evaluated by integrating charges for a hydrogen desorption peak in the potential range of 0.03 V to 0.4 V (vs. RHE). The calculated ECSA of the samples, Pt/C, PtFe, PtFe$_{high}$Cu$_{low}$, and PtFe$_{low}$Cu$_{high}$ respectively were 84.1, 102.6, 86.7, and 67.4 m$^2$g$^{-1}$.

Linear sweep voltammograms (LSV) of the samples for ORR were measured in an electrolyte of O$_2$-saturated 0.1 M HClO$_4$ at a rotation speed of 1600 rpm. Compared with Pt/C, the PtFe and PtFeCu catalysts both show a higher onset potential and a higher half-wave potential (E$_{1/2}$).

Figure 4D:
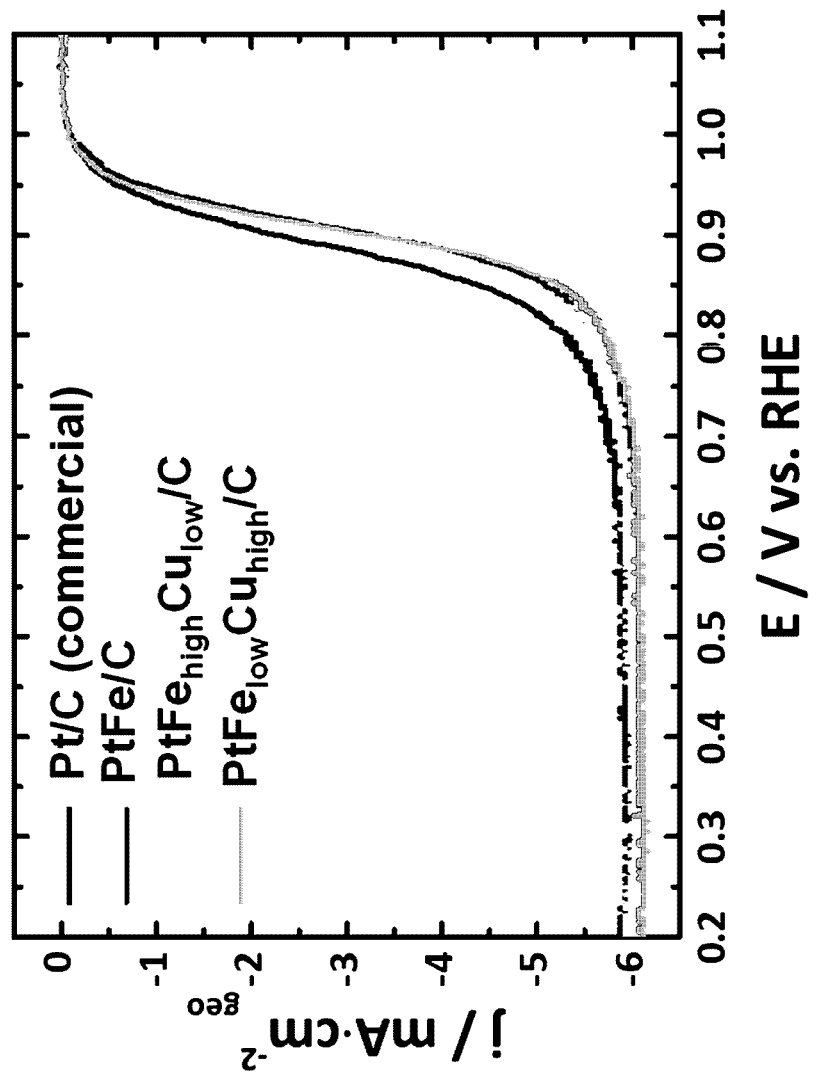

As shown in FIG. 4D, PtFe$_{high}$Cu$_{low}$ exhibited the highest mass activity (0.67 m$^2$g$^{-1}$ at 0.9 V). This mass activity was 3.2 times greater than that of Pt/C (0.21 m$^2$g$^{-1}$). Based on the electrochemical measurements, when Cu is appropriately added to a PtFe binary catalyst, ORR performance may be improved.

FIG. 4 shows that improved activity of ternary alloys was demonstrated by both calculation and experiment. However, these alloys are difficult to practically and commercially use without guaranteeing long-term stability. Accordingly, stability of the ternary alloy nanoparticles is evaluated.

When the model nanoparticles, PtFe, PtFe$_{high}$Cu$_{low}$, and PtFe$_{low}$Cu$_{high}$ having the same particle size were calculated with respect to an electrochemical dissolution potential, the results were respectively 0.96 V, 0.93 V, and 0.91 V.

Both of the binary (PtFe) and ternary (PtFeCu) nanoparticles were estimated to have a higher dissolution potential than pure 2.0 nm Pt nanoparticles (0.83 V vs. SHE)

The PtFe binary catalyst exhibited the highest electrochemical stability. However, since alloy nanocatalysts inevitably underwent a chemical reaction on the surfaces, durability thereof did not depend on an electrochemical environment alone.

As a matter of fact, three-dimensional transition metals such as Fe and Cu may be easily separated due to oxygen-absorbing ability. Accordingly, while the metals absorb an oxygen intermediate during ORR, it is necessary to determine whether or not the metals maintain surface structural integrity.

In order to examine a surface separation induced by an oxygen adsorbate, a passivation model in which oxygen is poisoned at the edges or vertices of nanoparticles may be assumed due to strong oxygen binding. Then, the PtFe binary nanoparticles and the PtFeCu ternary nanoparticles were examined with respect to separation of alloying elements (Fe and Cu) into four surface regions ([111], edge ([111]×[111]), and edge ([111]×[100]), [100]).

As shown in FIG. 5A, the surface separation appears in difficulty order of [100]>[111]> edge ([111]×[100])>edge ([111]×[111]). The [100] and [111] planes exhibited stronger resistance to the surface separation than the edge ([111]×[100]) and the edge ([111]×[111]). The [111] plane was very important for ORR, but was still relatively strong from the surface separation. Nevertheless, the Fe element that is weak against the surface separation may degrade long-term durability. On the other hand, Cu exhibited high surface separation resistance, and accordingly, Fe separation energies of PtFe$_{high}$Cu$_{low}$ and PtFe$_{low}$Cu$_{high}$ to the [111] planes (facet) are respectively −1.07 and −0.96 eV, while Cu separation energies were respectively −0.46 and −0.58 eV, e.g., about a half of Fe affinity. As shown in FIG. 5A, the relatively low surface separation energies of Cu atoms were also observed at other locations. This means that since Cu replaces Fe in a sub-shell, a high Cu composition in a PtFeCu ternary alloy may improve chemical stability.

However, as shown in PtFe$_{low}$Cu$_{high}$ (Pt$_{0.8}$Fe$_{0.08}$Cu$_{0.12}$), when a Cu concentration was limited, the Cu atoms may be easily located on the outermost surface of the ternary catalyst, as the Cu composition is increased. Accordingly, a Pt skin structure may be destroyed due to the high Cu content through the dealloy process with Cu on the surface (FIG. 2A).

Figure 5B:
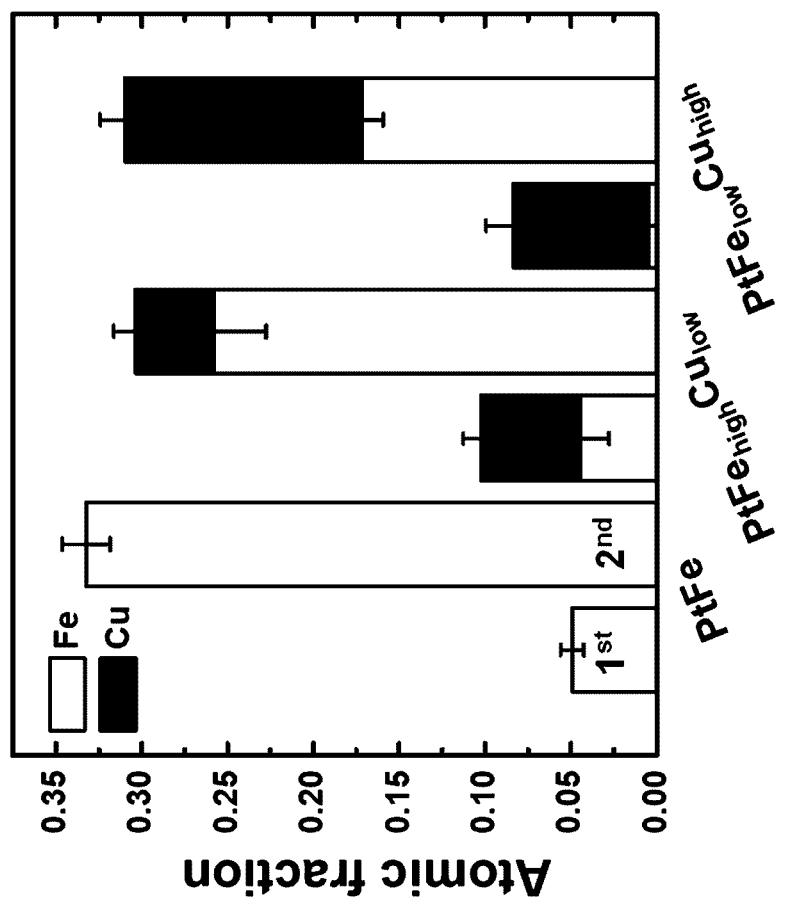

Distributions of the alloying elements were additionally analyzed to infer stability of PtFeCu having a different composition (FIG. 5B). Since sub-surface elements were separated into the outmost shell, element distributions in the primary and secondary shells were calculated. An atomic fraction was obtained by averaging 10 initial configurations of 4.0 nm nanoparticles randomly produced in the 9,000 MC step simulation. As a Cu content increases, Fe compositions of both the primary and secondary shells decrease. This result shows that the Cu introduction may improve catalyst stability.

Since Cu in the outermost shell was highly likely to be dealloyed, PtFe$_{low}$Cu$_{high}$ nanoparticles with a low Fe content in the primary and secondary shells were resistant to electrochemical cycles. Durability improvement by forming these ternary alloys may be demonstrated through a durability experiment test.

Figure 5C:
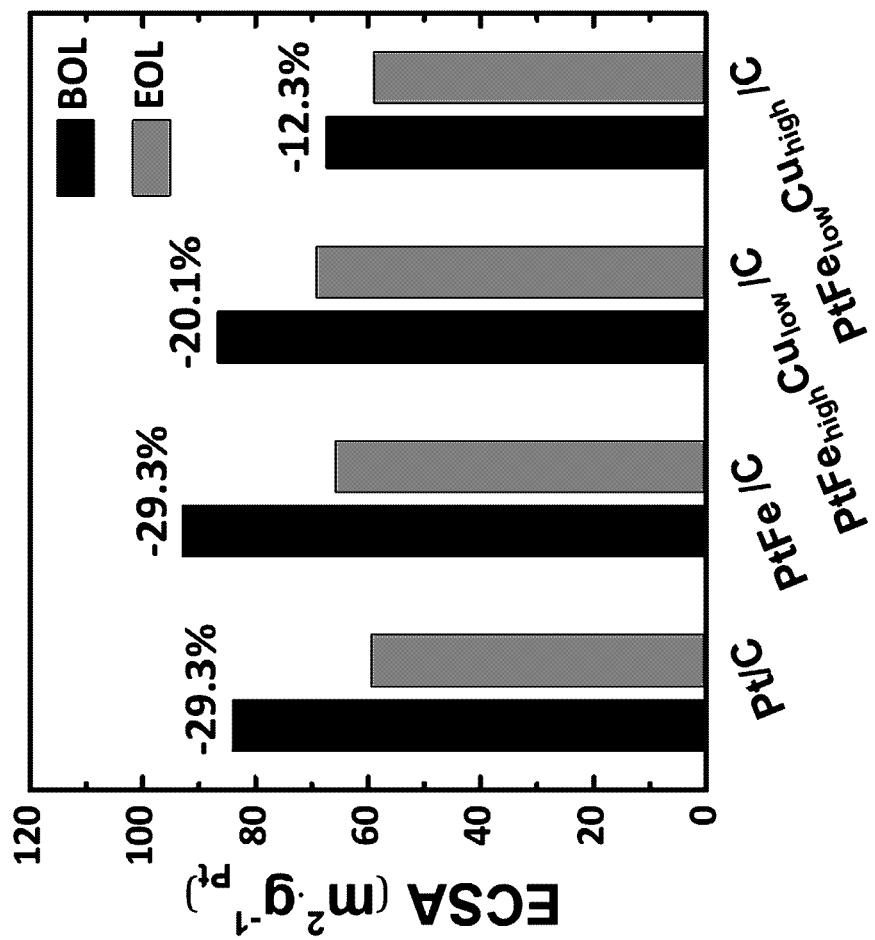
Figure 5D:
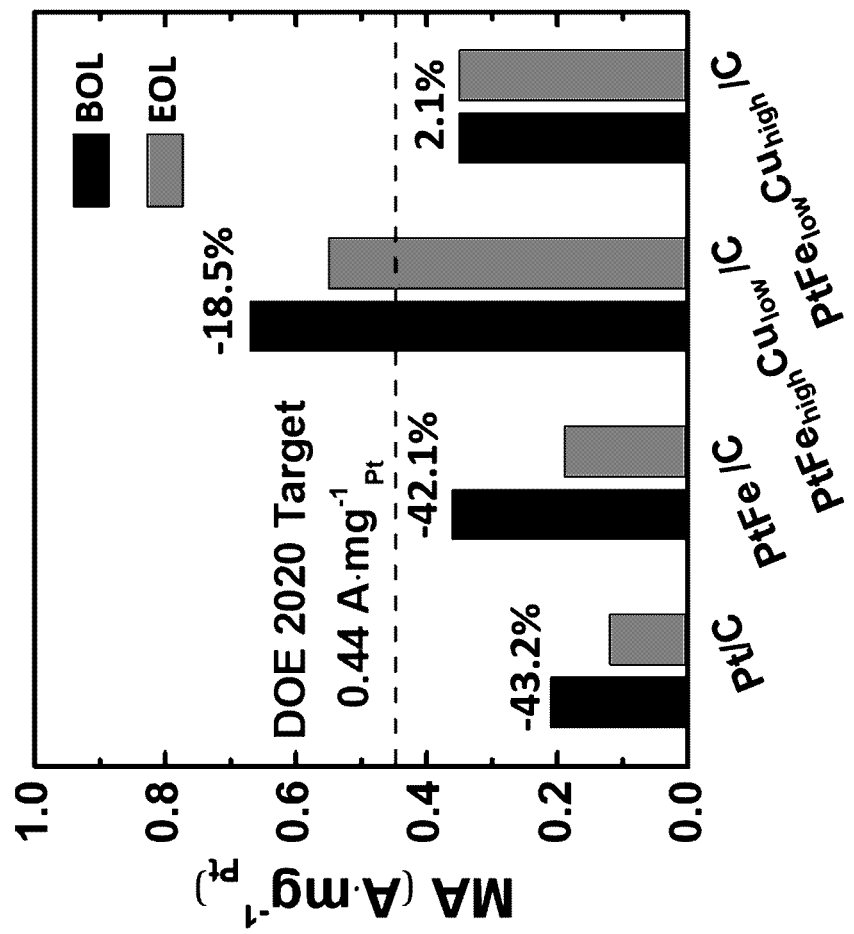

AST was performed by using spherical shape potential cycling of 0.6 V for 3 seconds and 0.95 V for 3 seconds. FIGS. 5C-5D respectively compared ECSA and MA at 0.9 V before and after AST 30 k.

The Pt/C and PtFe catalysts were confirmed to have similar durability. A large ECSA drop (−42.1%) in the PtFe catalyst was due to particle growth (from 2.95 nm to 4.56 nm) during AST 30 k. However, the two PtFeCu catalysts grew only by 0.3 nm during the experiment.

In addition, after AST 30 k, a change of ΔE$_{1/2}$ is 17 mV for PtFe, 4 mV for PtFe$_{high}$Cu$_{low}$, and −4 mV for PtFe$_{low}$Cu$_{high}$ occurred. These results indicate that the addition of Cu improved durability of the PtFe catalysts.

In addition, MA of the PtFe$_{high}$Cu$_{low}$ sample was three times greater than that of the Pt/C sample, and exceeded the 2020 target (0.44 Amg$_{Pt}^{-1}$) of DOE before and after AST 30 k (FIG. 5 ((D)).

According to various exemplary embodiments of the present invention, an alloying ratio of PtFeCu may be optimized by systematically examining the previously-reported advantageous roles of Cu, which adjusts strain energy of Pt on the surface and prevents Fe separation into the active surface of a catalyst, and also adopting a machine learning-based configuration space search algorithm.

As a result, $PtFe_{low}Cu_{high}$ may obtain the most excellent catalyst performance among the ternary composition samples.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a ternary catalyst for an oxygen reduction reaction, comprising:
    constructing a database comprising catalytic activity of oxygen reduction reaction (ORR) of PtFeCu nanoparticles using machine-learning-based neural network potential (NNP);
    determining thermodynamically stable PtFeCu nanoparticles through Monte Carlo calculation;
    selecting a type of the PtFeCu nanoparticles for the ternary catalyst by analyzing a structure of the PtFeCu nanoparticles; and
    synthesizing the selected PtFeCu nanoparticles.

2. The method of claim 1, wherein the neural network potential is constructed by machine-learning parameters of atomic interaction energies by density functional theory (DFT) calculation.

3. The method of claim 2, wherein a training set for machine-learning comprises atomic local environments with different morphologies, sizes, compositions, or configurations in which PtFeCu nanoparticles are divided by cut-off radius size.

4. The method of claim 3, wherein the atomic local environments comprise about 100 to 300 cuboctahedron random structures having a particle size of less than or equal to about 1.5 nm, 10 to 20 cuboctahedron random structures having a particle size of less than or equal to about 2.0 nm, 100 to 300 truncated octahedron random structures having a particle size of less than or equal to about 1.1 nm, and 50 to 150 truncated octahedron random structures having a particle size of less than or equal to about 1.7 nm.

5. The method of claim 1, wherein the catalytic activity of the oxygen reduction reaction of the PtFeCu nanoparticles is calculated by Equation 2:

$$\Delta G = \Delta E + \Delta ZPE - T\Delta S - neU \quad \text{[Equation 2]}$$

wherein, in Equation 2,
$\Delta G$ is the free energy of ORR,
$\Delta E$ is a change in internal energy of the reaction obtained by DFT calculation,
$\Delta ZPE$ and $\Delta S$ are changes in zero point energy and vibration entropy, respectively,
U is an electrode potential relative to the standard hydrogen electrode, and
n is the number of electrons participating in the reaction.

6. The method of claim 1, wherein the Monte Carlo calculation for each PtFeCu nanoparticle comprises n attempts of randomly exchanging atomic positions, and may be performed in about 10,000 trials at a temperature T (about 0 Kelvin or greater).

7. The method of claim 1, wherein the thermodynamically stable PtFeCu nanoparticles is determined by mapping the calculated density functional theory (DFT) of PtFeCu nanoparticles to a ternary phase diagram, and expressing the Monte Carlo calculation result as an energy convex hull on the ternary phase diagram.

8. The method of claim 1, wherein in order to configure the PtFeCu nanoparticles including a Pt shell, a Pt content based on a total weight of the PtFeCu nanoparticles is set to be greater than or equal to about 0.6 atomic fraction.

9. The method of claim 1, wherein the structure of the PtFeCu nanoparticles is analyzed by analyzing the number of atoms of Pt, Fe, and Cu in an each atomic shell of the PtFeCu nanoparticles.

10. The method of claim 1, wherein the chemical stability of the PtFeCu nanoparticles is evaluated by Equation 7:

$$E_{seg} = E(Pt_mFe_nCu_i)_{seg} - E(Pt_mFe_nCu_i)_{initial} \quad \text{[Equation 7]}$$

wherein, in Equation 7,
$E_{seg}$ is a surface separation energy of the alloy component induced by adsorption of oxygen atoms,
$E(Pt_mFenCui)se_g$ and $E(Pt_mFenCui)initiai$ are total energies of $Pt_mFenCui$ with or without surface separation, respectively, and
m, n, and i are the number of atoms of Pt, Fe, and Cu in the PtFeCu nanoparticles, respectively.

11. The method of claim 1, wherein the PtFeCu nanoparticles manufactured by the method is $Pt_{0.78}Fe_{0.09}Cu_{0.13}$ or $Pt_{0.78}Fe_{0.15}Cu_{0.07}$.

* * * * *